United States Patent
Führer et al.

(10) Patent No.: US 11,745,607 B2
(45) Date of Patent: Sep. 5, 2023

(54) CHARGING PLUG HAVING A LATCH CONNECTION DETECTING MEANS

(71) Applicant: PHOENIX CONTACT E-MOBILITY GMBH, Schieder-Schwalenberg (DE)

(72) Inventors: Thomas Führer, Blomberg (DE); Robert Babezki, Steinheim (DE)

(73) Assignee: PHOENIX CONTACT E-Mobility GmbH, Schieder-Schwalenberg (DE)

(*) Notice: Subject to any disclaimer, the term of this patent is extended or adjusted under 35 U.S.C. 154(b) by 134 days.

(21) Appl. No.: 17/312,717

(22) PCT Filed: Dec. 5, 2019

(86) PCT No.: PCT/EP2019/083866
§ 371 (c)(1),
(2) Date: Jun. 10, 2021

(87) PCT Pub. No.: WO2020/120288
PCT Pub. Date: Jun. 18, 2020

(65) Prior Publication Data
US 2022/0016988 A1 Jan. 20, 2022

(30) Foreign Application Priority Data
Dec. 10, 2018 (DE) .................... 10 2018 131 610.0

(51) Int. Cl.
*B60L 53/16* (2019.01)
*H01R 13/627* (2006.01)
(Continued)

(52) U.S. Cl.
CPC .......... *B60L 53/16* (2019.02); *H01R 13/6272* (2013.01); *H01R 13/6397* (2013.01);
(Continued)

(58) Field of Classification Search
CPC . B60L 53/16; H01R 13/6272; H01R 13/6397; H01R 13/6883
(Continued)

(56) References Cited

U.S. PATENT DOCUMENTS 8,932,072 B2 * 1/2015 Tamaki ............... B62J 43/16
439/345
9,106,015 B2 * 8/2015 Ohmura ............ H01R 13/6275
(Continued)

FOREIGN PATENT DOCUMENTS

CN 202 797 473 U 3/2013
DE 10 2009 039 652 A1 3/2011
(Continued)

OTHER PUBLICATIONS

International Preliminary Report on Patentability dated Jun. 24, 2021 in PCT Application No. PCT/EP2019/083866.

*Primary Examiner* — Alexander Gilman
(74) *Attorney, Agent, or Firm* — Occhiuti & Rohlicek LLP

(57) ABSTRACT

The invention relates to a charging plug (100) for coupling to a corresponding plug connection (200) and for transmitting electrical energy, said charging plug comprising a charging plug housing (110) having a latching body (10) which is provided for establishing a detachable frictional and/or interlocking connection between the charging plug (100) and the plug connection (200) together with a corresponding latching body (20) of the plug connection (200), the latching body (10) having at least one detecting element (11) in a portion of the latching body (10) which is provided for frictional and/or interlocking connection to the corresponding latching body (20), and the charging plug housing (110) having at least one sensor unit (111) by means of which the detecting element (11).

19 Claims, 4 Drawing Sheets

(51) Int. Cl.
*H01R 13/639* (2006.01)
*H01R 13/66* (2006.01)
*H01R 13/70* (2006.01)

(52) U.S. Cl.
CPC ....... *H01R 13/6683* (2013.01); *H01R 13/701* (2013.01); *H01R 2201/26* (2013.01)

(58) Field of Classification Search
USPC ........................................................ 439/352
See application file for complete search history.

(56) References Cited

U.S. PATENT DOCUMENTS

| | | | |
|---|---|---|---|
| 9,225,109 B2 * | 12/2015 | Sasaki | H01R 13/6683 |
| 9,263,830 B2 * | 2/2016 | Sugiyama | B60L 53/16 |
| 9,277,191 B2 * | 3/2016 | Rodriguez | H04N 7/188 |
| 9,509,095 B2 * | 11/2016 | Ohmura | B60L 53/16 |
| 9,620,897 B2 * | 4/2017 | Takagi | H01R 13/639 |
| 9,755,359 B2 * | 9/2017 | Moseke | H01R 13/6275 |
| 9,812,820 B2 * | 11/2017 | Takagi | B60L 53/16 |
| 10,232,720 B1 * | 3/2019 | Kinomura | H02G 3/0625 |
| 10,348,038 B2 * | 7/2019 | Ognjanovski | H01R 13/6397 |
| 10,630,029 B2 * | 4/2020 | Beimdieck | B60L 53/16 |
| 2011/0254377 A1 * | 10/2011 | Wildmer | H04B 3/00 307/104 |
| 2012/0108097 A1 * | 5/2012 | Takagi | H01R 13/6275 439/345 |
| 2012/0186309 A1 * | 7/2012 | Ishida | B60L 53/11 70/57 |
| 2013/0012054 A1 * | 1/2013 | Andresen | H01R 24/28 439/476.1 |
| 2015/0343915 A1 * | 12/2015 | Murakami | H01R 13/6395 307/130 |
| 2016/0144728 A1 * | 5/2016 | Harper | B60L 53/665 320/109 |
| 2017/0077650 A1 * | 3/2017 | Chang | G06K 19/07737 |
| 2018/0201145 A1 * | 7/2018 | Yellambalase | B60L 53/60 |
| 2022/0016988 A1 * | 1/2022 | Führer | H01R 13/701 |
| 2022/0297554 A1 * | 9/2022 | Garcia-Ferre | H01R 13/6683 |
| 2022/0355690 A1 * | 11/2022 | Linsmeier | B60K 6/387 |

FOREIGN PATENT DOCUMENTS

| | | |
|---|---|---|
| DE | 10 2011 121 194 A1 | 6/2013 |
| DE | 10 2014 217 696 A1 | 3/2016 |
| EP | 2 502 313 A1 | 9/2012 |
| JP | 2011-253672 A | 12/2011 |

* cited by examiner

CHARGING PLUG HAVING A LATCH CONNECTION DETECTING MEANS

CROSS-REFERENCE TO RELATED APPLICATIONS

This application is a national phase under 35 U.S.C. 371 of International Application No. PCT/EP2019/083866 filed on Dec. 5, 2019, which claims priority to German Application No. 10 2018 131 610.0 filed on Dec. 10, 2018, the contents of all of which are hereby incorporated by reference in their entireties.

The present invention relates to a charging plug for coupling to a corresponding plug connection and for transmitting electrical energy, comprising a charging plug housing having a latching body which is provided for establishing a detachable frictional and/or interlocking latching connection between the charging plug and the plug connection together with a corresponding latching body of the plug connection.

During the process of charging batteries, high electrical currents can flow through the charging plug. In particular, electrical charging powers of 300 kW and more can be achieved during the process of charging motor vehicles. Separation from the corresponding plug connection, for example a vehicle plug connection, can lead to such high powers that an arc is formed between the power contacts of the charging plug and the corresponding plug connection. The arc can lead to damage to the charging plug and the corresponding plug connection. In addition, the arc can be dangerous to a user of the charging plug and can result in serious injuries.

In order to prevent the charging plug from being separated from the corresponding plug connection, locking systems are known which are intended to prevent separation of a powered electrical connection. For example, locking systems are known in vehicles in which the charging plug has a latching body which engages in a corresponding latching body of the vehicle connector, a position of the latching body of the charging plug being detected by means of a position switch. If the latching body is in a latched position, an electromechanical locking system is activated on the vehicle plug connection, which system moves a locking body over the latching body in such a way that said latching body can no longer be detached manually. The battery is charged only when the latching body is in the latched position and the locking body locks said latching body. The locking body also prevents the charging plug from being separated from the vehicle plug connection. In addition, the charging process is interrupted if the position switch detects that the latching body is not in the latched position.

However, it has been found that charging plugs are exposed to considerable mechanical loads during use, in particular through misuse and/or direct vandalism. As a result of the considerable mechanical load, the latching bodies of the charging plugs can be damaged or even broken off.

Damage to the latching body of the charging plug can mean that there is no longer a latching connection between the corresponding latching bodies, so that locking is no longer possible and the charging plug can be separated from the vehicle plug connection. In addition, damage to the latching body can meant that the position switch for detecting the position of the latching body does not recognize that there is no longer a latching connection and continues the charging process despite the charging plug being separated from the vehicle plug connection. The separation of the charging plug from the vehicle plug connection during the charging process, in particular at full load, can lead to an arc which can damage the charging plug and/or the vehicle plug connection and pose a significant risk to a user of the charging plug.

The object of the present invention is to provide a charging plug having a latching connection, the functionality of which can be reliably and continuously checked with little technical effort, thus achieving safer operation of the charging plug.

This object is achieved by a charging plug having the features of claim 1, advantageous designs being described in the embodiments of the dependent claims.

More precisely, the object addressed is achieved by a charging plug in which the latching body has at least one detecting element in a portion of the latching body which is provided for frictional and/or interlocking connection to the corresponding latching body, the charging plug having at least one sensor unit which is arranged in or on the charging plug housing and by means of which the detecting element can be detected. The charging plug housing preferably has the at least one sensor unit. As a result, the detecting element is located in a portion of the latching body that is exposed to increased mechanical load, so that damage is most likely to take place in this portion of the latching body. In addition, damage to the latching body in this portion means that the latching connection no longer works or the functionality of the latching connection is at least limited. By detecting the detecting element by means of the sensor unit, the portion of the latching body which is exposed to increased mechanical load and which is necessary for safe functioning of the latching connection is thus monitored.

Safer operation of the charging plug can advantageously be achieved in this way, since the functionality of the latching connection is monitored by the sensor unit and the detecting element. In particular, by monitoring this portion, it is possible to detect damage to the latching body early and to take safety measures to prevent the charging plug from being separated from the corresponding plug connection during the charging process, in particular at full load, or not to start a charging process at all.

The sensor unit of the charging plug is preferably provided for detecting the presence of the detecting element on the latching body, the charging plug and/or a charging station connected to the charging plug having a control circuit which is connected to the sensor unit for signaling, and the control circuit being designed to prevent or reduce a current flow through a charging cable of the charging plug when at least one detecting element is not present on the latching body. The sensor unit thus detects whether the detecting element is located on the latching body. A signal is output by the sensor device when the detecting element is not present or the detecting element is not located on the latching body. If the detecting element is not located on the latching body because, for example, the portion of the latching body in which the detecting element was located has broken off due to increased mechanical load, this is determined by the control circuit and the charging plug and/or the charging station is controlled such that a charging process is not carried out at all or is interrupted.

This advantageously ensures that no charging process takes place when the latching connection is inoperative. In particular, this prevents the charging plug from separating or being able to separate from the corresponding plug connection during the charging process. In this way, damage to the charging plug and/or the plug connection and any danger to the user are effectively prevented.

The sensor unit of the charging plug is preferably provided for contactlessly detecting the detecting element. The detecting element is particularly preferably a passive component that does not have to be supplied with electricity. As a result, the sensor unit is spatially separated from the detecting element. In particular, this has the result that the sensor unit does not experience any mechanical load, whereas the detecting element is arranged in a portion of the latching body that is exposed to increased mechanical load. The sensor unit is advantageously protected from damage in this way, and therefore the functionality is continuously maintained. In addition, it is advantageous that the position of the detecting element on the latching body can be freely selected, since no line guiding in or on the latching body is required. In particular, it is also advantageous that such detecting elements are relatively small so that they can be arranged in or on the latching body with no or only minimal mechanical impairment.

In a preferred embodiment, the detecting element has a magnet, the sensor unit having a magnetic field sensor which is provided for determining a magnetic field of the magnet. The use of a powerful miniature permanent magnet is particularly preferred. Advantageously, a detecting element can thereby be provided which can be detected contactlessly by the magnetic field, is spatially compact, can be mechanically loaded and is inexpensive to manufacture. In addition, a combination of the magnet and the magnetic field sensor allows reliable measurement of the presence, a distance and/or a change in distance of the magnet from the magnetic field sensor in a simple manner, since magnetic field sensors in particular allow precise measurement of a magnetic field change and the strength of the magnetic field at the position of the magnetic field sensor depends in particular on the distance from the magnet.

An alternative or cumulative embodiment is characterized in that the detecting element has an RFID component, the sensor unit having an electromagnetic transmitting and/or receiving unit which is provided for interrogating the RFID component. Advantageously, a detecting element is provided such that detection can be carried out in a contactless manner by an electromagnetic field by means of the corresponding transmitting and/or receiving unit. In particular, in the case of a plurality of detecting elements, an allocation can be implemented through the use of RFID components, so that the transmitting and/or receiving unit can be used to determine which RFID component is not present, or which portion of the latching body is damaged, in particular broken off. In addition, passive RFID components are spatially compact and inexpensive to manufacture.

The latching body of the charging plug preferably has a latching hook which can engage behind a latching projection of the corresponding latching body, the latching hook having at least one recess in which the detecting element is arranged. The latching hook is preferably located on a front end of a latching lever of the latching body facing the corresponding plug connection, which lever is mounted so as to be pivotable about a bearing center of gravity within the charging plug. The latching hook of the latching body and the latching projection of the corresponding latching body form a detachable latching connection between the charging plug and the corresponding plug connection, which latching connection prevents the charging plug from separating from the plug connection at full load. The detecting element arranged in the recess of the latching hook is thus located in the portion of the latching body which is exposed to increased mechanical load and ensures the function of the latching connection. The detecting element can advantageously monitor whether the latching hook or a portion of the latching hook that has the detecting element is located on the latching body. The arrangement of the detecting element in a recess in the latching hook has the advantages that the external shape of the latching hook remains unchanged and the detecting element in the recess is protected from external influences, in particular mechanical loads. The recess is particularly preferably formed by a blind hole that is easy to implement.

The recess is also preferably located on a support surface of the latching hook, which is provided for coming into contact with the corresponding latching body and has no contact with the latching projection. The recess is particularly preferably located in a latching corner region between the support surface and a latching surface of the latching hook, which latching surface is provided for coming into contact with the latching projection of the corresponding latching body by engaging behind same. The latching corner region defined by the latching surface and the support surface of the latching hook is exposed to increased mechanical load, so that this region is typically damaged and/or broken off most frequently. In addition, the function of the latching connection is ensured by the latching surface of the latching hook, since the latching surface of the latching hook engages behind the latching projection of the corresponding latching body in the latched state. In this way, the portion of the latching hook which is responsible for the functionality of the latching connection and which accordingly also experiences an increased mechanical load is advantageously monitored by the sensor unit.

The latching body of the charging plug preferably has at least two detecting elements, these being spatially distributed over the latching hook of the latching body. In this way, different portions of the latching hook can advantageously be monitored by the sensor unit, so that damage, in particular a portion of the latching hook being broken off, can also be detected. In particular, this increases safety, since the reliability of the latching connection is not ensured when the latching hook is partially damaged either.

The latching body of the charging plug also preferably has two detecting elements, the two detecting elements each being located in lateral corner regions between the support surface of the latching hook and a side surface of the latching hook. Arranging the detecting elements in the lateral corner regions advantageously achieves monitoring of portions of the latching hook which are frequently damaged, in particular break off.

The sensor unit is preferably arranged within the charging plug housing. In this way, the sensor unit is advantageously protected from external influences, in particular the weather. It is also advantageous that the signal path to a control circuit arranged within the charging plug housing is relatively short.

The charging plug housing preferably has a front element on a side provided for connection to the corresponding plug connection, the sensor unit being arranged on a side of the front element facing the detecting element. The distance between the sensor unit and the detecting element is advantageously reduced in this way, and therefore the detecting element can be more easily detected by the sensor unit.

A roof portion is preferably arranged on the front element of the charging plug housing above the latching body, the sensor unit being arranged between the roof portion and the latching body on an end face of the front element facing the corresponding plug connection. The sensor unit is advantageously protected by the roof portion, in particular from mechanical load and rain.

Furthermore, the sensor unit is preferably arranged on a side of the roof portion facing the detecting element. This advantageously means that the sensor unit is protected by the roof portion. In addition, the distance between the detecting element and the sensor unit is shortened, and therefore the detecting element can be more easily detected.

The sensor unit is preferably provided for determining a distance or a change in distance between the detecting element and the sensor unit, the charging plug and/or a charging station connected to the charging plug having a control circuit which is connected to the sensor unit for signaling and is designed to determine a position of the latching body in the charging plug housing. The control circuit determines the position of the latching body from a signal from the sensor unit. For example, in the case of a latching body which has a pivotable latching lever, the pivot position of the latching lever is determined. If, in this example, the latching body is in a latched pivot position, the distance between the detecting element and the sensor unit is greater than in an unlatched pivot position, so that the pivot position can be deduced from the distance measurement. A change in the position of the latching body can also be determined by the change in the distance being measured by the sensor unit. In particular, the position of the latching body can be determined by measuring the change in the magnetic field. In this design variant, current flows through the charging plug only when the latching body is in the latched or locked state. In addition, it can be preferred that a locking system of the corresponding plug connection is activated when the latching body is in the latched state. In this way, a function test of the latching connection and a measurement of the latching body position can advantageously be carried out by a single sensor unit, so that in particular an additional position switch for detecting the latching body position within the charging plug housing can be dispensed with.

Further advantages, details and features of the invention can be found in the following in the described embodiments, in which.

In the following description, the same reference signs denote the same components or features, so that a description of a component with reference to one drawing also applies to the other drawings, thus avoiding repetitive description. Furthermore, individual features which have been described in connection with one embodiment can also be used separately in other embodiments.

Figure 1A:
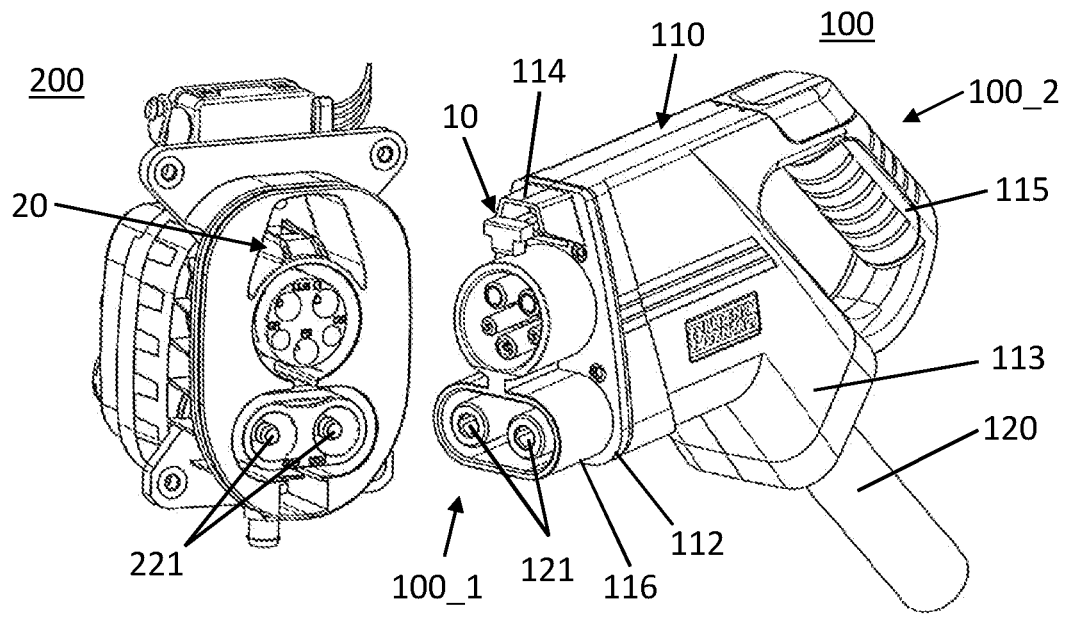
FIG. 1A is a perspective view of a charging plug and a corresponding plug connection in the separated state.

FIG. 1A is a perspective view of a charging plug 100. The charging plug 100 has a front region 100_1 which is provided for being plugged into a corresponding plug connection 200. The charging plug 100 has a charging plug housing 110 which is formed of a front element 112 and a housing body 113. On the rear region 100_2 of the charging plug 100, there is a handle 115 which is provided for handling the charging plug 100. A charging cable 120 is inserted into the charging plug housing 110, the power lines of which cable are connected in the charging plug housing 110 to front power contact sockets 121. The power contact sockets 121 are provided for establishing an electrical connection to power contact pins 221 of the corresponding plug connection 200. In order to protect the power contact sockets 121, the front element 112 has a contact protection wall 116.

During the process of charging batteries, high electrical powers can be transmitted through the charging plug 100, so that separation from the corresponding plug connection 200 can lead to the formation of an arc between the power contact sockets 121 and the power contact pins 221. To prevent separation at full load, the charging plug 100 has a latching body 10 which, in the plugged-together state, forms a detachable frictional and/or interlocking latching connection together with a corresponding latching body 20 of the corresponding plug connection 200.

Figure 1B:
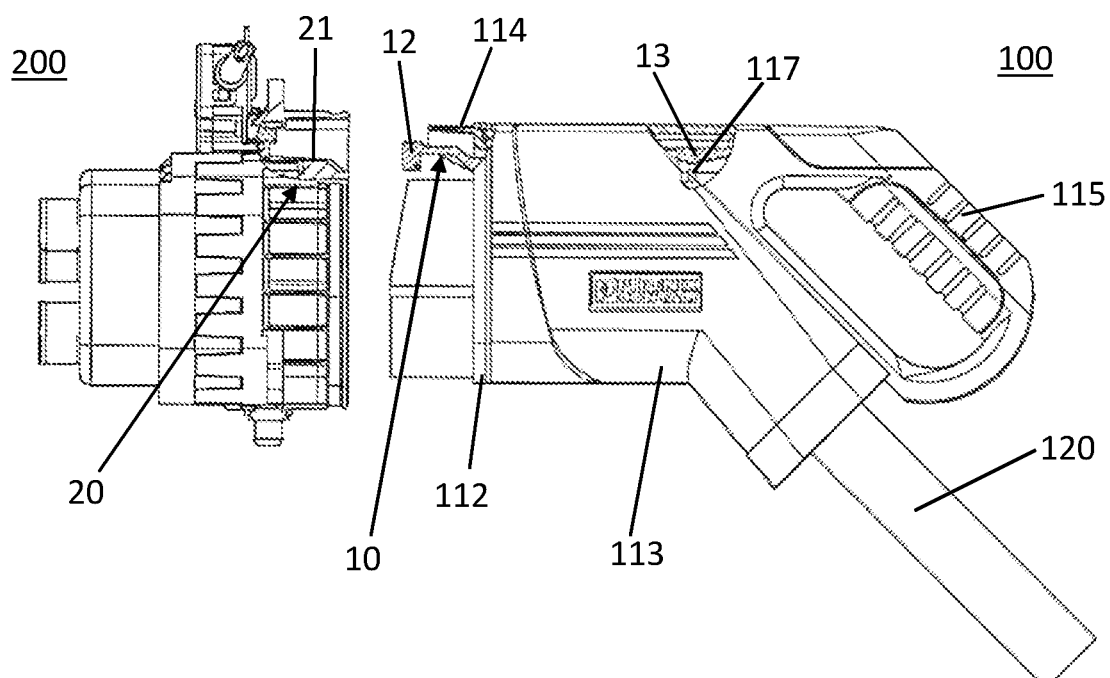
FIG. 1B is a side view of the charging plug and the corresponding plug device in the separated state.

FIG. 1B is a side view of the charging plug 100 and the corresponding plug device 200 in the separated state. The region provided for the latching connection and a rear region of the charging plug housing 110 are shown in this illustration as a side longitudinal section. The arrangement of the latching body 10 within the charging plug 100 can be seen from the side longitudinal section. The latching body 10 has a front latching hook 12 and a latching lever 13 which is mounted in the charging plug housing 110 so as to be pivotable about a bearing center of gravity. The pivot position of the latching body 10 is determined by means of a position switch 117. In the separated state, the position switch 117 is not in contact with the latching lever 13 of the latching body 10.

Figure 2A:
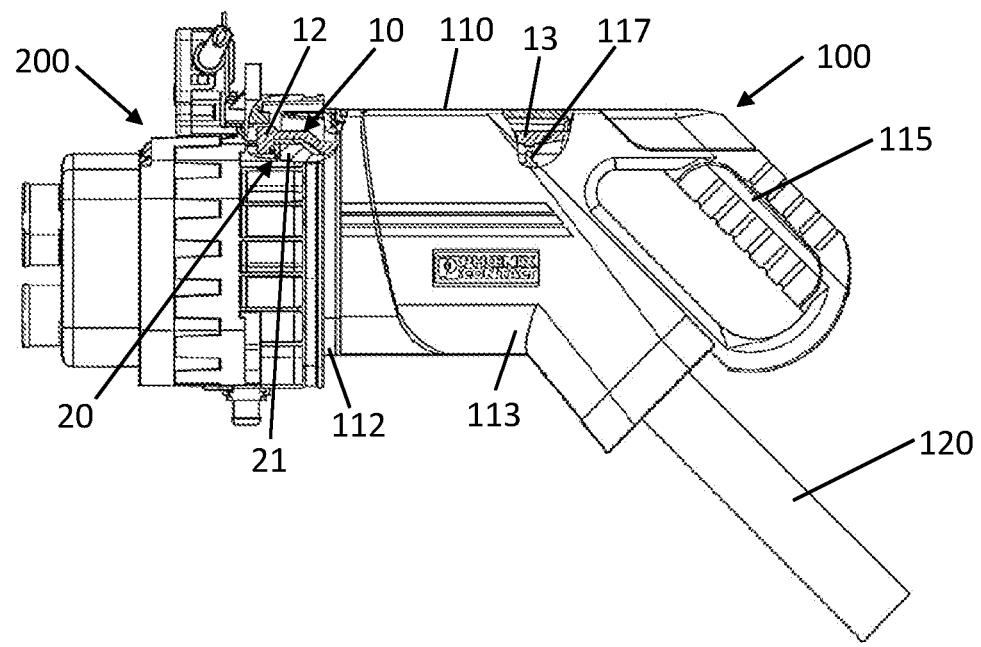
FIG. 2A is a side view of the charging plug and the corresponding plug connection in the plugged-together state.

FIG. 2A is a side view of the charging plug 100 and the corresponding plug connection 200 in the plugged-together state. The region provided for the latching connection is shown as a side longitudinal section in this illustration. This region is shown enlarged in FIG. 2B. In the plugged-together state, the latching hook 12 engages behind a latching projection 21 of the corresponding latching body 20, a latching surface 16 of the latching hook 12 being in contact with a latching edge 22 of the latching projection 21, such that the two latching bodies 10 and 20 are in the latched state. In the plugged-together state there is no contact between the latching lever 13 and the position switch 117. There is contact between the position switch 117 and the latching lever 13 when the charging plug 100 is plugged into the corresponding plug connection 200 and the latching hook 12 of the latching body 10 slides along the latching projection 21 of the corresponding latching body 20. The latching lever 13 is preferably acted upon by a spring force, so that the latching hook 12 on the front is pushed into a latched pivot position.

Figure 2B:
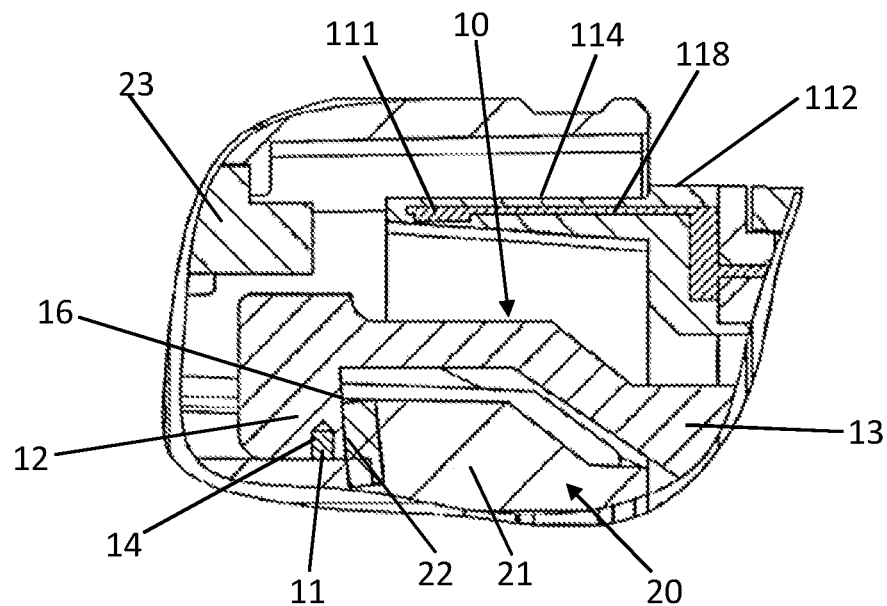
FIG. 2B is an enlarged longitudinal sectional side view of a latching connection in the latched state with function monitoring according to the invention by means of a detecting element arranged on a latching body and a sensor unit.
Figure 7:
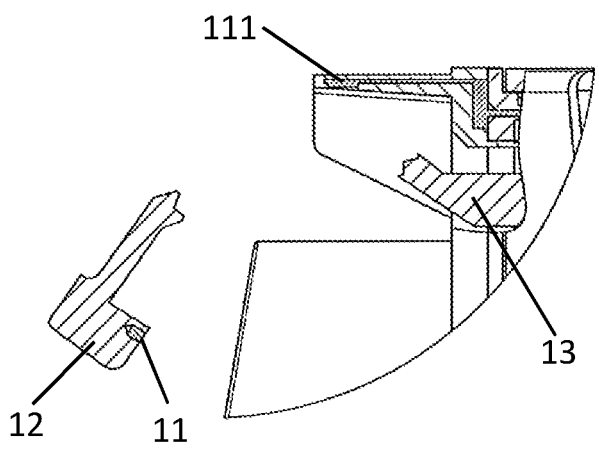
FIG. 7 is an enlarged side view of the region of the charging plug provided for the latching connection, a latching hook being broken off from the latching body.
Figure 8:
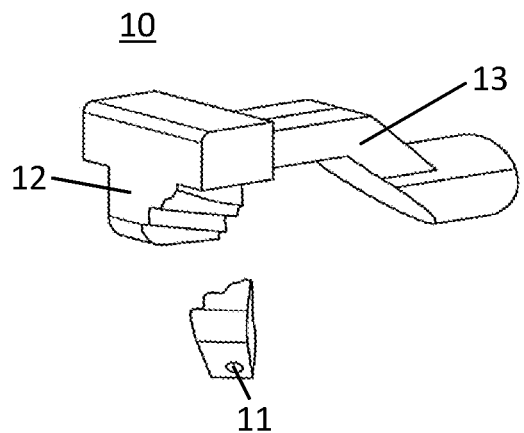
FIG. 8 is a perspective view of the latching body, a lateral corner region of the latching hook being broken off.

In order to avoid separation of the charging plug at full load, a locking system is activated by the corresponding plug connection and a locking body 23 is moved in the direction of the charging plug 100 when the latching body 10 is in the latched position. As shown in FIGS. 2A and 2B, the locking body 23 is then located above the latching body 10 and thus prevents the latching body 10 from being pivoted out of the latched position. In addition, a charging process is started only when the locking body 23 is in the locked state shown. As an additional safety measure, a charging process is interrupted when the position switch 117 detects that the latching body 10 is pivoted into an unlatched position. These safety measures no longer function if the latching hook 12, as shown in FIGS. 7 and 8, is damaged or broken off, since the charging plug 100 can in this case be pulled out of the corresponding plug connection 200 without pivoting the latching body 10.

In order to monitor the function of the latching connection, the latching body 10 has a detecting element 11 and the charging plug housing 110 has a sensor unit 111. As shown in FIG. 2B, the detecting element 11 is preferably arranged in a recess 14 of the latching hook 12, since the latching hook 12 is exposed to increased mechanical load and is responsible for the functioning of the safety measures. The sensor unit 111 is preferably arranged on a side of a roof portion 114 of the front element 112 facing the detecting element 11 in order to achieve the smallest possible distance between the detecting element 11 and the sensor unit 111. The sensor unit 111 is connected via a sensor line 118 to a control circuit which prevents a charging process through the charging plug 100 or does not start the charging process at all when the sensor unit 111 determines that the detecting element 11 is not located on the latching body 12 or is not present on the latching body 10. If the sensor unit 111 detects that the detecting element 11 is not present on the latching body 10, this is an indication that the latching hook 12 or a portion of the latching hook 12 with the detecting element 11 arranged therein is damaged, in particular broken off, and therefore the functionality of the latching connection is no longer ensured.

Figure 3A:
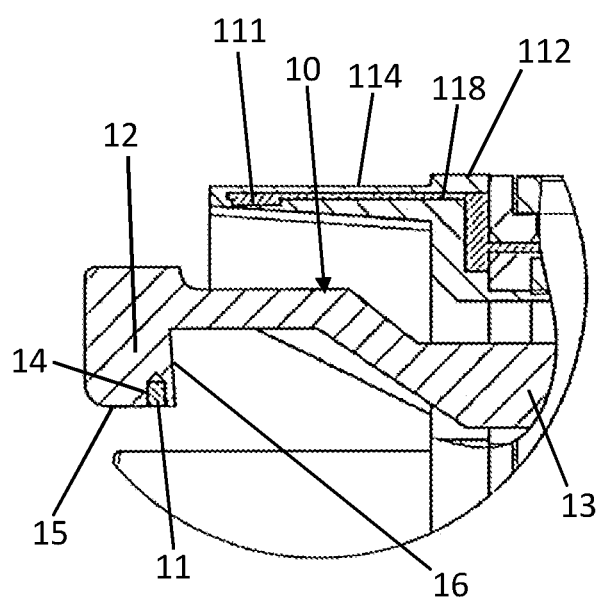
FIG. 3A is an enlarged longitudinal sectional side view of the region of the charging plug provided for the latching connection, the sensor unit being arranged on a roof portion of a front element of a charging plug housing.
Figure 3B:
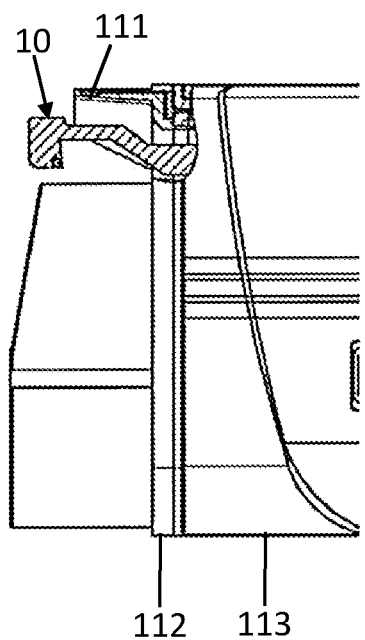
FIG. 3B is a side view of the front of the charging plug with a longitudinal section of the region provided for the latching connection from FIG. 3A.

FIGS. 3A and 3B show the design variant of the charging plug 100 from FIGS. 2A and 2B, the corresponding plug connection 200 not being shown. In this embodiment, the sensor unit 111 is located on a side of a roof portion 114 of the front element 112 facing the detecting element 11 and is connected by a signal line guided in the roof portion 114 to a control circuit that is located in the charging plug housing 110 or in a charging station connected to the charging plug 100. The sensor unit 111 is advantageously arranged closer to the detecting element 11 in this way.

Figure 4A:
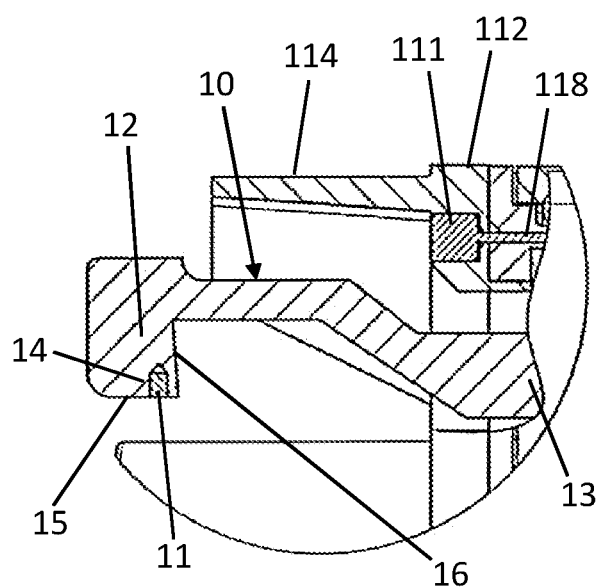
FIG. 4A is an enlarged longitudinal sectional side view of the region of the charging plug provided for the latching connection, the sensor unit being arranged on the front element of the charging plug housing below the roof portion.
Figure 4B:
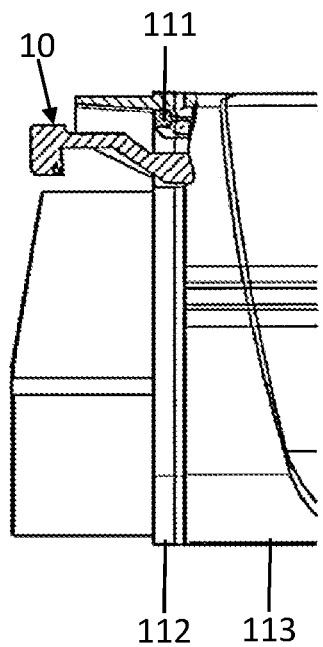
FIG. 4B is a side view of the front of the charging plug with a longitudinal section of the region provided for the latching connection from FIG. 4A.

FIGS. 4A and 4B show a further design variant of the charging plug, FIG. 4B showing a side view and FIG. 4A showing an enlarged longitudinal sectional side view of the region provided for the latching connection. In this design variant, the sensor unit 111 is arranged on the side of the front element 112 of the charging plug housing 110 facing the detecting element 11. The sensor unit 111 is arranged below the roof portion 114 and above the latching body 10 for protection against mechanical load and weather. The sensor line 118 is guided through the front element 112 into the interior of the charging plug housing 110 to a control circuit.

Figure 5:
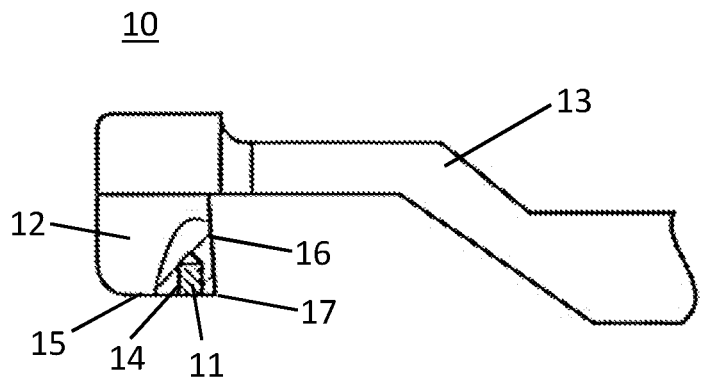
FIG. 5 is a side view of a latching body of the charging plug with a longitudinal section in the region of the detecting element.

The latching body 10 is shown in FIG. 5 in a side view. The latching hook 12 is arranged at the front end of the latching lever 13. The latching hook 12 has a support surface 14 which is provided for coming into contact with the corresponding latching body 20 or to rest thereon, as shown in FIG. 2B. The latching surface 16 is provided for contact with the latching projection 21 of the corresponding latching body 20. The latching hook 12 has a latching corner region 17 between the support surface 14 and the latching surface 16. As shown by the longitudinal section in FIG. 5, the latching corner region 17 of the latching hook 12 has a recess 14 in which the detecting element 11 is arranged. In this way, the detecting element 11 is located in the portion of the latching hook 12 which has an increased mechanical load and is responsible for the function of the latching connection.

Figure 6A:
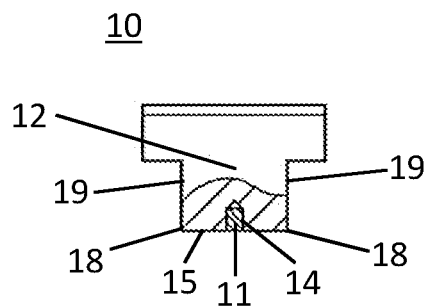
FIG. 6A is a front view of the latching body in cross-section in the region of the detecting element, the latching body having a detecting element.

FIG. 6A is a front view of the latching body 10, which has a recess 14 on the latching hook 12, in which recess a sensor unit 11 is arranged. In the case of a single recess, this is preferably located in the center of the latching hook 12 in the transverse direction. In the longitudinal direction, the recess 14, as shown in FIG. 5, is preferably located in the latching corner region 17.

Figure 6B:
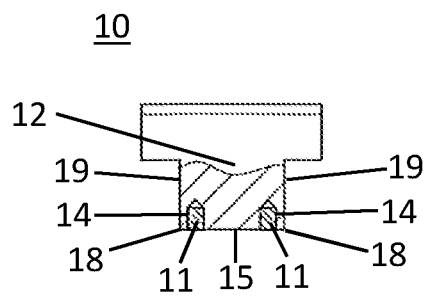
FIG. 6B is a front view of the latching body in cross-section in the region of the detecting elements, the latching body having two detecting elements.

The design variant of the latching body 10 shown in FIG. 6B has two detecting elements 11 which are arranged one in each of the two recesses 14. The latching hook 12 has two side surfaces 19 on its sides. The lateral corner regions 18 of the latching hook 12 are located between the side surfaces 19 and the support surface 15. In this design variant, there is a recess 14 in each of the lateral corner regions 18, in each of which recesses at least one detecting element 11 is arranged. In the longitudinal direction, the recess 14, as shown in FIG. 5, is preferably located in the latching corner region 17. When the charging plug 100 is in operation, there are high mechanical loads in the corner regions 17 and 18 that can damage the latching hook. In particular, the lateral corner regions 18 and/or latching corner regions 17 can break off more easily under mechanical load.

In the design variants shown, the detecting elements 11 can be detected contactlessly by the sensor unit 111, the detecting elements 11 preferably being passive, i.e. not requiring an electrical supply. The detecting elements 11 preferably each have at least one magnet, the magnetic field of which can be determined by a magnetic field sensor of the sensor unit 111. The detecting elements 11 also preferably have at least one RFID component that can be read out by a corresponding transmitting and/or receiving unit.

FIGS. 7 and 8 show, for example, possible damage to the latching body 10, which can be registered by the detecting element 11 in combination with the sensor unit 111. In FIG. 7, the latching lever 13 of the latching body 10 is broken, so that the entire latching hook 12 is no longer located on the latching body 10. FIG. 8 shows damage whereby a lateral corner region 18 of the latching hook 12 has broken off.

LIST OF REFERENCE SIGNS

10 Latching body (of the charging plug)
11 Detecting element
12 Latching hook
13 Latching lever
14 Recess
15 Support surface (of the latching hook)

16 Latching surface (of the latching hook)
17 Latching corner region (of the latching hook)
18 Lateral corner regions (of the latching hook)
19 Side surfaces (of the latching hook)
20 Corresponding latching body (of the plug connection)
21 Latching projection (of the corresponding latching body)
22 Latching edge
23 Locking body (of the plug connection)
100 Charging plug
100_1 Front region (of the charging plug)
100_2 Rear region (of the charging plug)
110 Charging plug housing
111 Sensor unit
112 Front element (of the charging plug housing)
113 Housing body (of the charging plug housing)
114 Roof portion (of the charging plug housing)
115 Handle (of the charging plug housing)
116 Contact protection wall (of the charging plug housing)
117 Position switch
118 Sensor line (of the sensor unit)
120 Charging cable (of the charging plug)
121 Power contact socket
200 Corresponding plug connection
221 Power contact pin

The invention claimed is:

1. Charging plug for coupling to a corresponding plug connection and for transmitting electrical energy, comprising a charging plug housing having a latching body which is provided for establishing a detachable frictional and/or interlocking connection between the charging plug and the plug connection together with a corresponding latching body of the plug connection, wherein
the latching body has a portion that is provided for frictional and/or interlocking connection to the corresponding latching body, said portion including a detecting element and wherein
the charging plug has at least one sensor unit which is arranged in or on the charging plug housing and by means of which the detecting element can be detected.

2. Charging plug according to claim 1, characterized by the following feature:
the sensor unit is arranged within the charging plug housing.

3. Charging plug according to claim 1, characterized by the following features:
the sensor unit is provided for determining a distance and/or a change in distance between the detecting element and the sensor unit; and
the charging plug and/or a charging station connected to the charging plug has a control circuit which is connected to the sensor unit for signaling; and
the control circuit is configured to determine a position of the latching body in the charging plug housing.

4. Charging plug according to claim 1, characterized by the following features:
the charging plug housing has a front element on a side provided for connection to the corresponding plug connection; and
the sensor unit is arranged on a side of the front element facing the detecting element.

5. Charging plug according to claim 4, characterized by the following features:
the front element of the charging plug housing has a roof portion above the latching body; and
the sensor unit is arranged between the roof portion and the latching body on an end face of the front element facing the corresponding plug connection; and/or
the sensor unit is arranged on a side of the roof portion facing the detecting element.

6. Charging plug according to claim 1, characterized by the following feature:
the sensor unit is provided for detecting the detecting element contactlessly.

7. Charging plug according to claim 6, characterized by the following features:
the detecting element has a magnet; and
the sensor unit has a magnetic field sensor which is provided for determining a magnetic field of the magnet.

8. Charging plug according to claim 6, characterized by the following features:
the detecting element has an RFID component; and
the sensor unit has an electromagnetic transmitting and/or receiving unit which is provided for interrogating the RFID component.

9. Charging plug according to claim 1, characterized by the following features:
the sensor unit is provided for detecting the presence of the detecting element on the latching body; and
the charging plug and/or a charging station connected to the charging plug have a control circuit which is connected to the sensor unit for signaling; and
the control circuit is configured to prevent or reduce a current flow through a charging cable of the charging plug when at least one detecting element is not present or is incorrectly positioned on the latching body.

10. Charging plug according to claim 9, characterized by the sensor unit being provided for detecting the detecting element contactlessly.

11. Charging plug according to claim 9, characterized by the following features:
the latching body has a latching hook which can engage behind a latching projection of the corresponding latching body; and
the latching hook has at least one recess in which the detecting element is arranged.

12. Charging plug according to claim 9, characterized by the following feature:
the sensor unit is arranged within the charging plug housing.

13. Charging plug according to claim 9, characterized by the following features:
the charging plug housing has a front element on a side provided for connection to the corresponding plug connection; and
the sensor unit is arranged on a side of the front element facing the detecting element.

14. Charging plug according to claim 9, characterized by the following features:
the sensor unit is provided for determining a distance and/or a change in distance between the detecting element and the sensor unit; and
the charging plug and/or a charging station connected to the charging plug has a control circuit which is connected to the sensor unit for signaling; and
the control circuit is configured to determine a position of the latching body in the charging plug housing.

15. Charging plug according to claim 1, characterized by the following features:

the latching body has a latching hook which can engage behind a latching projection of the corresponding latching body; and the latching hook has at least one recess in which the detecting element is arranged.

16. Charging plug according to claim 15, characterized by the following features:

the recess is located on a support surface of the latching hook, which support surface is provided for coming into contact with the corresponding latching body and has no contact with the latching projection; and/or the recess is located in a latching corner region between the support surface and a latching surface of the latching hook, which latching surface is provided for coming into contact with the latching projection of the corresponding latching body by engaging behind same.

17. Charging plug according to claim 15, characterized by the following features:

the latching body has at least two detecting elements; and the detecting elements are spatially distributed over the latching hook of the latching body.

18. Charging plug according to claim 17, characterized by the following features:

the latching body has two detecting elements; and the two detecting elements are each located in lateral corner regions between the support surface of the latching hook and a side surface of the latching hook.

19. Charging plug according to claim 16, characterized by the following features:

the latching body has at least two detecting elements; and the detecting elements are spatially distributed over the latching hook of the latching body.

* * * * *